(12) United States Patent
Ishima et al.

(10) Patent No.: US 7,287,812 B2
(45) Date of Patent: Oct. 30, 2007

(54) VEHICLE SEAT

(75) Inventors: Shinya Ishima, Tochigi (JP); Masaki Nagayama, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 11/091,373

(22) Filed: Mar. 29, 2005

(65) Prior Publication Data

US 2005/0280294 A1 Dec. 22, 2005

(30) Foreign Application Priority Data

Mar. 31, 2004 (JP) .............................. 2004-102527

(51) Int. Cl.
*A47C 7/74* (2006.01)
(52) U.S. Cl. .............................. 297/180.14; 297/452.47
(58) Field of Classification Search ........... 297/180.13, 297/180.14, 180.1, 180.16, 452.47, 452.56
See application file for complete search history.

(56) References Cited

U.S. PATENT DOCUMENTS 4,043,544 A * 8/1977 Ismer ........................... 267/83
5,924,766 A * 7/1999 Esaki et al. ............. 297/180.13
6,048,024 A * 4/2000 Wallman ................. 297/180.14
6,206,465 B1 * 3/2001 Faust et al. ............. 297/180.14
6,736,452 B2 * 5/2004 Aoki et al. ............. 297/180.13
6,857,697 B2 * 2/2005 Brennan et al. ....... 297/180.13

FOREIGN PATENT DOCUMENTS

| JP | U 63-149333 | 6/1988 |
| JP | A 06-048448 | 7/1994 |
| JP | A 10-297274 | 11/1998 |
| JP | A 2003-285628 | 10/2003 |
| JP | A 2003-299551 | 10/2003 |

\* cited by examiner

*Primary Examiner*—Milton Nelson, Jr.
(74) *Attorney, Agent, or Firm*—Oliff & Berridge, PLC (57) ABSTRACT

A vehicle seat having: a seat cushion and a seat back formed by covering a surface of a seat pad with a top cover member; a plurality of air holes which penetrate the seat pad to reach a surface of the top cover member; a plurality of air outlets which project from a surface of a duct to be connected to the air holes; and an air blower to pressure and feed air inside a vehicle compartment to the air holes through the duct and the air outlets, wherein at least a portion of one of the air holes is formed in a tapered shape with a diameter which decreases toward the surface of the top cover member.

7 Claims, 6 Drawing Sheets

VEHICLE SEAT

BACKGROUND OF THE INVENTION

1. Field of the Invention

The present invention relates to a vehicle seat having an air conditioning function.

2. Description of the Related Art

Recently, there is known a vehicle seat having an air conditioning function in which a plurality of air holes are provided in a top cover member of a seat cushion and a seat back of the vehicle seat, and air from an air blower is ejected from the air holes (refer to JP-Tokukaihei-10-297274).

The vehicle seat disclosed in JP-Tokukaihei-10-297274 is schematically configured such that the plurality of air holes are provided to penetrate a top cover member, a cover pad and a pad forming the seat cushion and the seat back, an air blower, an intermediate duct and a seat cushion air exhaust duct are arranged on a lower surface of the seat cushion, and a seat back air exhaust duct is arranged on a back surface of the seat back.

A plurality of air outlets which slightly project from the surface to engage with the inside of the air holes are formed on the seat cushion air exhaust duct and the seat back air exhaust duct. The air from the air blower is fed to the seat cushion air exhaust duct and the seat back air exhaust duct through the intermediate duct, and is then ejected from the air holes connected to the air outlets to the seat surface.

However, in the vehicle seat disclosed in JP-Tokukaihei-10-297274, the diameter of each air hole is constant on both of the top cover member side and the side to which the air outlet is connected. Thus, for example, when the pressure of the air which was sent from the duct to the air holes through the air outlets is low, the air to be ejected from the seat surface also has a low pressure, or the pressure may become lower, so that there may be a case where a passenger sitting in the seat can not have a comfortable feeling of the air.

Also, when the diameter of the air holes is large, a passenger sitting in the seat may have an uncomfortable feeling to hip or back by the existence of the air holes, raising a problem of giving an uncomfortable feeling when sit in the seat.

SUMMARY OF THE INVENTION

The present invention has been achieved in view of the above problem, and an object of the present invention is to provide a vehicle seat which comprises a seat air conditioning function capable of ejecting comfortable air with high pressure, and which can provide a comfortable feeling when sitting in the seat.

To solve the above problem, in accordance with the first aspect of the present invention, the vehicle seat of the present invention comprises:

a seat cushion and a seat back formed by covering a surface of a seat pad with a top cover member;

a plurality of air holes which penetrate the seat pad to reach a surface of the top cover member;

a plurality of air outlets which project from a surface of a duct to be connected to the air holes; and an air blower to pressure and feed air inside a vehicle compartment to the air holes through the duct and the air outlets, wherein at least a portion of one of the air holes is formed in a tapered shape with a diameter which decreases toward the surface of the top cover member.

According to the vehicle seat, at least a portion of one of the air holes is formed in a tapered shape with a diameter which decreases toward the surface of the top cover member. Thus, for example, even when the air sent to the air holes from the ducts through the air outlets has low pressure, the pressure increases as the diameter decreases. Therefore, the air ejected from the surface of the seat can have high pressure.

Moreover, since the air hole is formed such that the diameter thereof decreases toward the surface of the seat, it can be suppressed that a passenger has an uncomfortable feeling to hip or back by the existence of the air holes when the passenger sits in the vehicle seat.

Further, by forming a portion to be the air hole of the member forming the seat pad in a tapered shape, at the time of molding the seat pad, it can easily be removed from a mold.

Consequently, it is possible to obtain the vehicle seat which has a seat air conditioning function capable of ejecting comfortable air with high pressure, comfortable to sit in, and is further easy to be manufactured.

Preferably, in the vehicle seat of the present invention, the seat pad comprises a pad and a cover pad covering a surface of the pad, and the pad in one of the air holes is formed in a tapered shape with a diameter which decreases toward the surface of the pad.

According to the vehicle seat, the seat pad comprises the pad and the cover pad covering a surface of the pad, and the pad in one of the air holes is formed in a tapered shape with a diameter which decreases toward the surface of the pad, so that by forming only the pad having the largest thickness among the members forming the air hole in a tapered shape, the above described effect can be easily obtained.

BRIEF DESCRIPTION OF THE DRAWINGS

The present invention will become more fully understood from the detailed description given hereinafter and the accompanying drawings which are given by way of illustration only, and thus are not intended as a definition of the limits of the present invention, and wherein.

DETAILED DESCRIPTION OF THE PREFERRED EMBODIMENTS

The preferred embodiments for embodying the present invention will be explained in detail below referring to the drawings.

Figure 1:
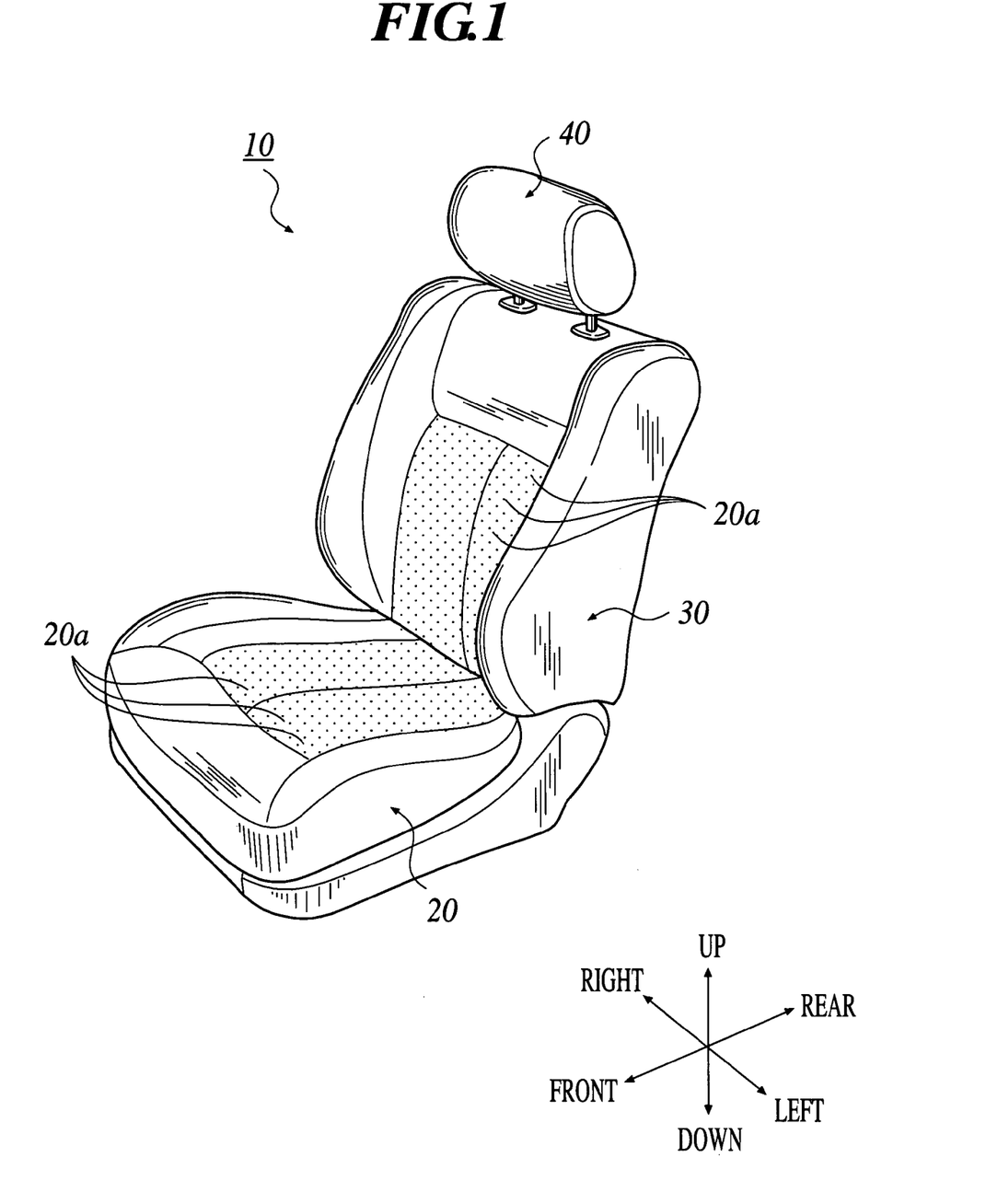
FIG. 1 is a perspective view showing an outline of a vehicle seat.
Figure 2:
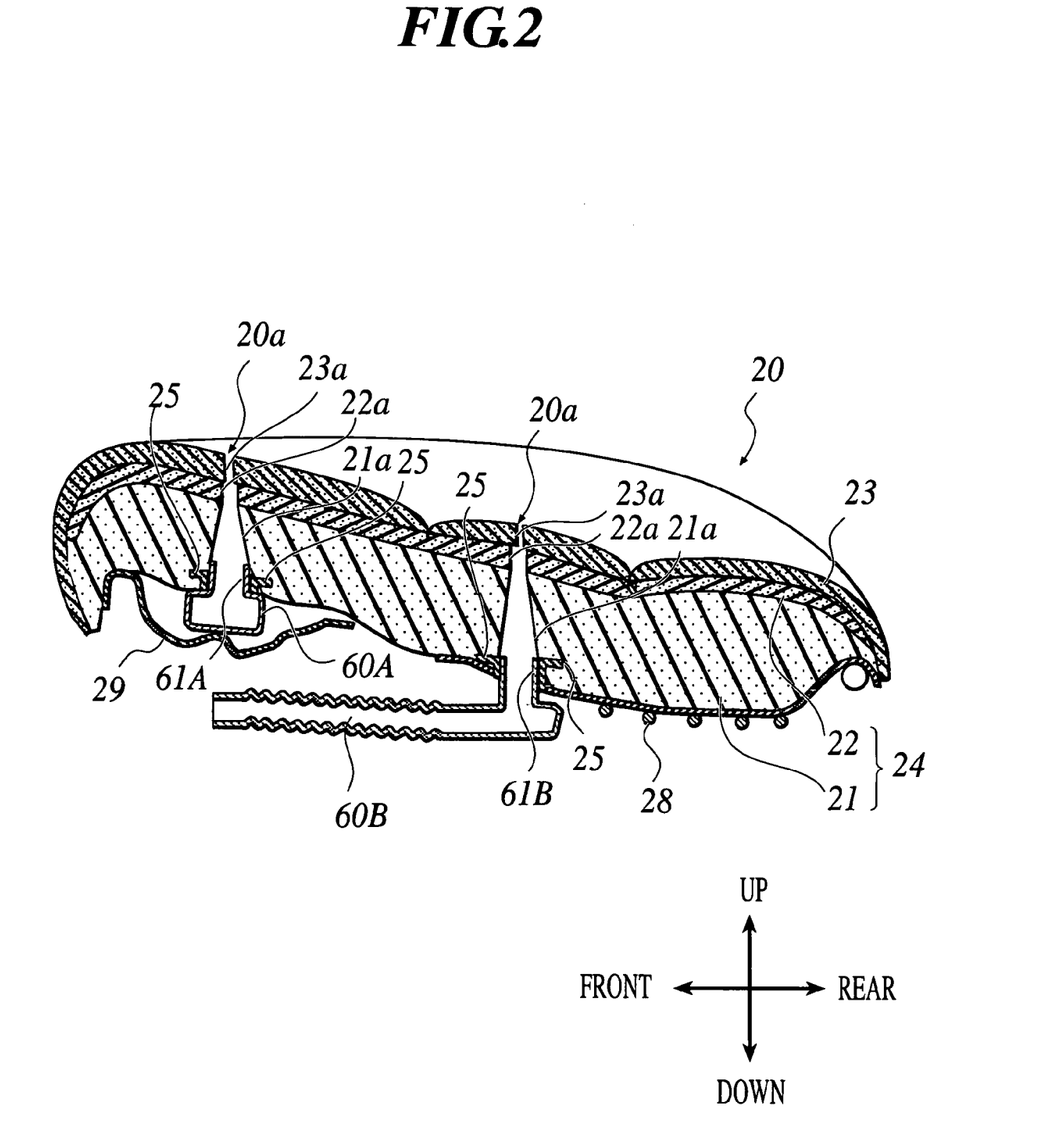
FIG. 2 is a longitudinal sectional view of a main portion showing a structure of a seat cushion.

As shown in FIG. 1, a vehicle seat 10 is schematically configured to comprise a seat cushion 20, a seat back 30, a head rest 40 provided on the upper portion of the seat back 30 and the like. Among them, as shown in FIG. 2, the seat cushion 20 is configured such that a surface of a pad 21 which keeps a seat shape and functions as a cushion member is covered with a cover pad 22 with permeability, and the surface of the cover pad 22 is further covered with a top cover member 23. FIG. 2 shows the seat cushion 20, however, similarly, the seat back 30 is also configured such that the surface of the pad 21 is covered with the cover pad 22 and the top cover member 23. Hereinafter, the combination of the pad 21 and the cover pad 22 is described as a "seat pad 24".

As shown in FIG. 1, there are a plurality of air holes 20a formed in the surface of the top cover member 23. Each air hole 20a is configured to comprise a top cover member air hole 23a formed in the top cover member 23, a cover pad air hole 22a formed in the cover pad 22 and a pad air hole 21a formed in the pad 21, and penetrates from the surface of the top cover member 23 to the back surface of the seat pad 24.

Figure 3:
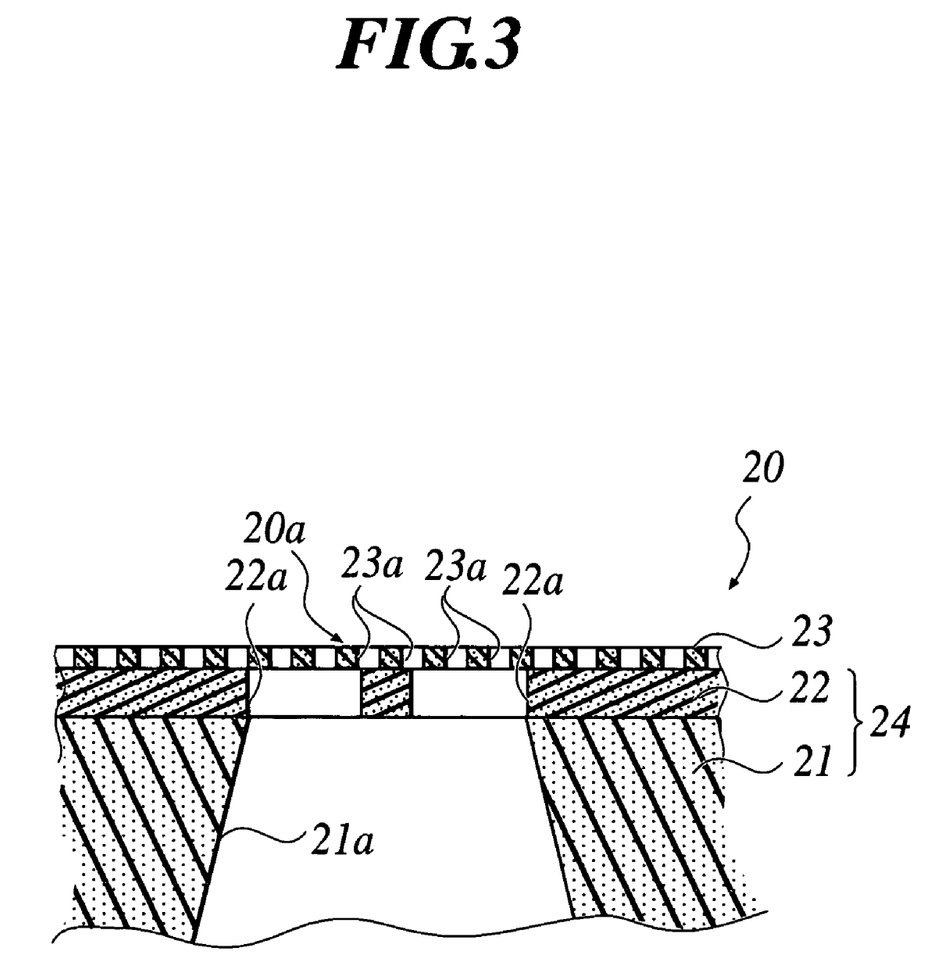
FIG. 3 is a longitudinal sectional view showing a structure of an air hole.

At least a portion of the air hole 20a is formed in a tapered shape with the diameter thereof decreasing toward the front surface of the top cover member 23. In the embodiment, as shown in FIGS. 2 and 3, the pad air hole 21a formed in the pad 21 of each air hole 20a is formed in a tapered shape with the diameter thereof decreasing toward the front surface of the pad 21 which contacts the cover pad 22. In FIG. 2, it appears that one cover pad air hole 22a and one top cover member air hole 23a correspond to one pad air hole 21a in the air hole 20a, however, in practice, as shown in FIG. 3, two cover pad air holes 22a each having a diameter smaller than that of the pad air hole 21a correspond to one pad air hole 21a, and three or more top cover member air holes 23a each having a diameter smaller than that of the cover pad air hole 22a correspond to the two cover pad air holes 22a. The angle of the taper or the like may be appropriately formed according to various conditions.

Further, a tubular insert member 25 is embedded inside the air hole 20a. The insert member 25 is fixed to the inside of the pad air hole 21a of the air hole 20a by producing the seat pad 24 by foam molding in a state where the insert member 25 is arranged at the predetermined position in a seat pad molding die beforehand.

Although FIGS. 2 and 3 show the seat cushion 20, the seat back 30 has the similar structure, that is, at least a portion of the air hole 20a is formed in a tapered shape with the diameter thereof decreasing toward the front surface of the top cover member.

Figure 4:
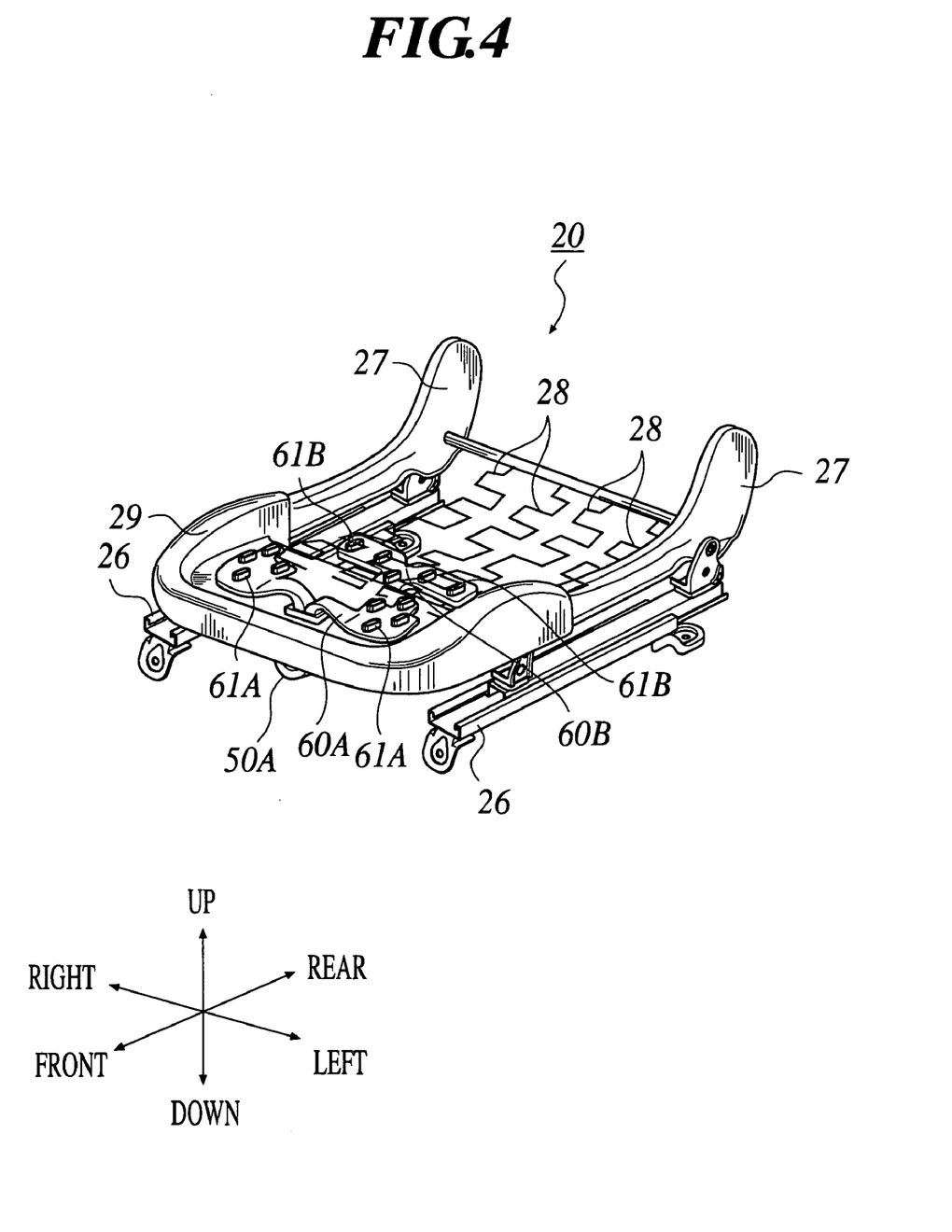
FIG. 4 is a perspective view showing a framework structure of the seat cushion side of the vehicle seat.
Figure 5:
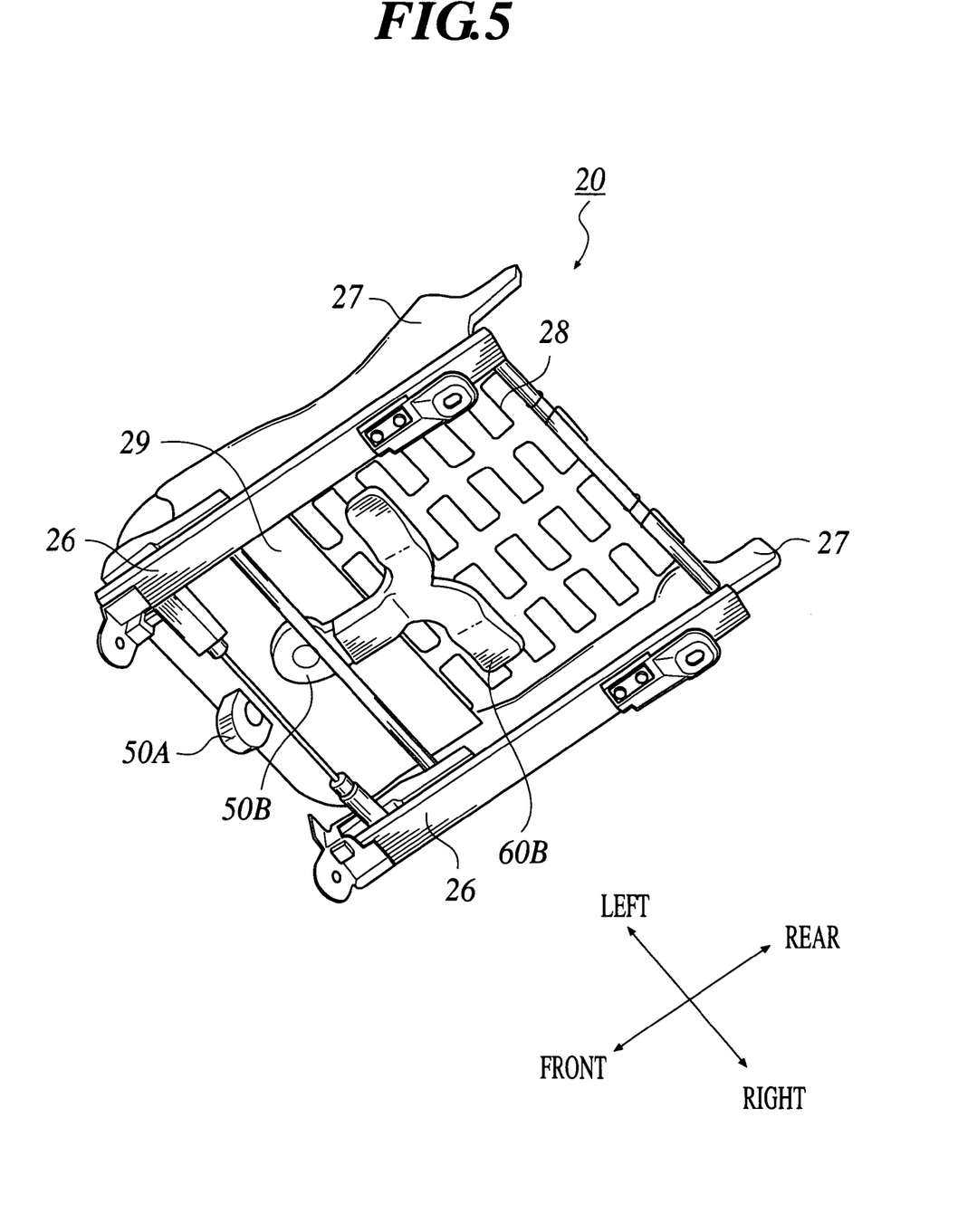
FIG. 5 is a perspective view showing the framework structure of the seat cushion side of the vehicle seat.

FIG. 4 is a perspective view showing a framework structure of the seat cushion 20 side of the vehicle seat 10, and FIG. 5 is a perspective view of the framework structure as seen from the lower surface side.

The framework structure of the seat cushion 20 side is schematically configured to comprise a pair of right and left seat rails 26, a pair of right and left seat frames 27 attached to the seat rails 26, seat springs 28, a pan frame 29 which is crossed over the seat springs 28 and the front portions of the seat frames 27, and the like.

As shown in FIG. 5, air blowers 50A and 50B for the seat cushion 20 are attached to the front and center of the lower surface of the pan frame 29, respectively.

As shown in FIG. 4, a duct 60A connected to the air blow hole of the front air blower 50A passes the opening provided in the pan frame 29 to reach the upper surface of the pan frame 29, and extends backward on the upper surface of the pan frame 29 in the state of branching off in right and left direction.

As shown in FIG. 5, a duct 60B connected to the air blow hole of the central (back) air blower 50B extends backward on the lower surface side of the pan frame 29, and branches off in right and left direction.

As shown in FIG. 2, a plurality of tubular air outlets 61A, 61B are provided to project upward at the positions on the upper surfaces of the ducts 60A, 60B corresponding to the plurality of air holes 20a.

Figure 6:
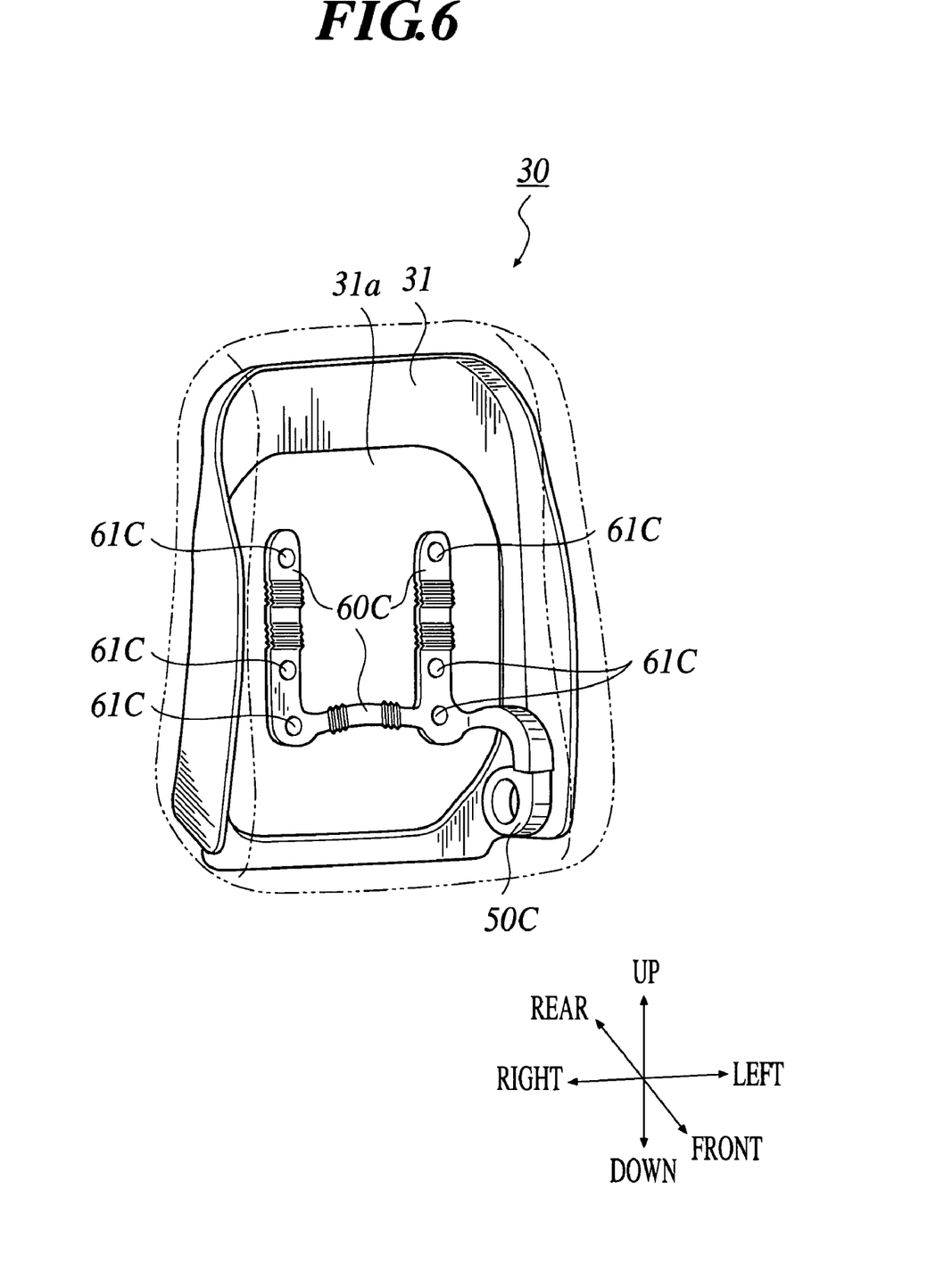
FIG. 6 is a perspective view showing a framework structure of the seat back side of the vehicle seat.

FIG. 6 is a back view of the seat back 30, and the seat back 30 is schematically configured to comprise a sub seat frame 31 having an opening 31a in the center, a seat spring (omitted from the drawings) attached to the sub seat frame 31 and the like.

An air blower 50C for the seat back 30 is attached to one of the right and left lower sides of the back surface of the sub seat frame 31.

A duct 60C connected to the air blow hole of the air blower 50C extends upward from the right and left positions in the opening 31a of the sub seat frame 31.

At the positions corresponding to the plurality of air holes 20a on the front surface of the duct 60C, similar to the above seat cushion 20 side, a plurality of tubular air outlets 61C are provided to project upward.

The air outlets 61A, 61B, 61C of the seat cushion 20 side and the seat back 30 side engage the insides of the air holes 20a of the seat cushion 20 side and the seat back 30 side, respectively.

Next, the operation of the vehicle seat 10 of the embodiment will be explained.

In the case of making the seat air conditioning function in the vehicle seat 10, the air blowers 50A, 50B, 50C are activated to feed air into the ducts 60A, 60B, 60C, and the air is sent from the ducts 60A, 60B, 60C to the air holes 20a through the air outlets 61A, 61B, 61C. Then, since the pad air hole 21a formed in the pad 21 of each air hole 20a is formed in a tapered shape, the pressure of the air increases as the diameter of the pad air hole 21a decreases. Thus, when the air is ejected from the surface of the top cover member 23, the air can have enough pressure.

As above, according to the vehicle seat 10 of the embodiment, at least a portion of each air hole 20a is formed in a tapered shape with the diameter thereof decreasing toward the surface of the top cover member 23, so that, for example, even when the air sent to the air holes 20a from the ducts 60A, 60B, 60C through the air outlets 61A, 61B, 61C has low pressure, the pressure increases as the diameter decreases. Thus, the air ejected from the surface of the seat can have high pressure.

Moreover, since the air holes 20a are formed such that the diameter thereof decreases toward the surface of the seat, it can be suppressed that a passenger has an uncomfortable feeling to hip or back by the existence of the air holes 20a when the passenger sits in the vehicle seat 10.

Further, by forming a portion to be the air hole 20a of the member forming the seat pad 24 in a tapered shape, at the time of molding the seat pad, it can easily be removed from a mold.

Consequently, it is possible to obtain the vehicle seat 10 which has a seat air conditioning function capable of ejecting comfortable air with high pressure, comfortable to sit in, and is further easy to be manufactured.

In the embodiment, the seat pad 24 comprises the pad 21 and the cover pad 22 covering the surface thereof, and the pad 21 of each air hole 20a is formed in a tapered shape with the diameter thereof decreasing toward the surface thereof, so that by forming only the pad 21 having the largest thickness among the members forming the air hole 20a in a tapered shape, the above described effect can be easily obtained.

As above, the vehicle seat according to the present invention is useful as a seat mounted on the vehicle such as an automobile or the like, especially, the vehicle seat is suitable as a seat to give comfortable feeling to a passenger when the passenger sit in.

The present invention is not limited to the above embodiment, and various improvements and design changes may be made without departing from the scope of the invention.

The entire disclosure of Japanese Patent Application Nos. Tokugan 2004-102527 which was filed on Mar. 31, 2004, Tokugan 2004-102594 which was filed on Mar. 31, 2004, Tokugan 2004-102601 which was filed on Mar. 31, 2004, Tokugan 2004-102620 which was filed on Mar. 31, 2004, and Tokugan 2004-102639 which was filed on Mar. 31, 2004, including specification, claims, drawings and summary are incorporated herein by reference in its entirety.

What is claimed is:

1. A vehicle seat comprising:
   a seat cushion and a seat back formed by covering a surface of a seat pad with a top cover member;
   a plurality of air holes which penetrate the seat pad to reach a surface of the top cover member;
   a plurality of air outlets which project from a surface of a duct to be connected to the air holes; and
   an air blower to pressure and feed air inside a vehicle compartment to the air holes through the duct and the air outlets,
   wherein the seat pad comprises a pad and a cover pad covering a surface of the pad, and in the pad, at least one of the plurality of air holes is formed in a tapered shape with a diameter which decreases toward the surface of the top cover member,
   wherein the plurality of air holes which penetrate the seat pad comprises a plurality of air holes in the pad and a plurality of holes in the cover pad,
   wherein the plurality of air holes in the pad are each formed in a tapered shape with a diameter which decreases toward the top surface of the top cover member and the plurality of holes in the cover pad are each formed in a non-tapered shape.

2. The vehicle seat of claim 1, wherein the top cover member includes a plurality of holes that penetrate the top cover member and reach an outer surface of the top cover member.

3. The vehicle seat of claim 2, wherein the plurality of holes in the top cover member each has a diameter smaller than one of the plurality of holes in the seat pad and at least two or more top cover member holes are aligned with one pad air hole.

4. The vehicle seat of claim 1, wherein an insert member is embedded in each of the plurality of holes in the seat pad to connect the air holes to the duct and the air outlets.

5. The vehicle seat of claim 4, wherein the insert has a tubular shape and is fixed to the inside of the pad air hole.

6. A vehicle seat comprising:
   a seat cushion and a seat back formed by covering a surface of a seat pad with a top cover member;
   a plurality of air holes which penetrate the seat pad to reach a surface of the top cover member;
   a plurality of air outlets which project from a surface of a duct to be connected to the air holes; and
   an air blower to pressure and feed air inside a vehicle compartment to the air holes through the duct and the air outlets,
   wherein the seat pad comprises a pad and a cover pad covering a surface of the pad, and in the pad, at least one of the plurality of air holes is formed in a tapered shape with a diameter which decreases toward the surface of the top cover member,
   wherein the plurality of air holes which penetrate the seat pad comprises a plurality of air holes in the pad and a plurality of holes in the cover pad,
   wherein the plurality of holes in the cover pad each has a diameter smaller than one of the plurality of holes in the pad and at least two or more cover pad holes are aligned with one pad air hole.

7. A vehicle seat comnrising:
   a seat cushion and a seat back formed by covering a surface of a seat pad with a top cover member;
   a plurality of air holes which penetrate the seat pad to reach a surface of the top cover
   a plurality of air outlets which project from a surface of a duct to be connected to the air holes; and
   an air blower to pressure and feed air inside a vehicle compartment to the air holes through the duct and the air outlets,
   wherein the seat pad comprises a pad and a cover pad covering a surface of the pad, and in the pad, at least one of the plurality of air holes is formed in a tapered shape with a diameter which decreases toward the surface of the top cover member,
   wherein the top cover member includes a plurality of holes that penetrate the top cover member and reach an outer surface of the top cover member,
   wherein a plurality of holes in the cover pad each has a diameter smaller than one of the plurality of holes in the pad, the plurality of holes in the top cover member each has a diameter smaller than one of the plurality of holes in the cover pad, at least two or more cover pad holes are aligned with one pad air hole, and at least three or more top cover member holes are aligned with the two or more cover pad holes.

* * * * *

UNITED STATES PATENT AND TRADEMARK OFFICE
CERTIFICATE OF CORRECTION

PATENT NO. : 7,287,812 B2
APPLICATION NO. : 11/091373
DATED : October 30, 2007
INVENTOR(S) : Shinya Ishima and Masaki Nagayama It is certified that error appears in the above-identified patent and that said Letters Patent is hereby corrected as shown below:

Claim 7, column 6, line 28, change "reach a surface of the top cover" to read --reach a surface of the top cover member;--

Signed and Sealed this

Twenty-ninth Day of April, 2008

JON W. DUDAS
*Director of the United States Patent and Trademark Office*